United States Patent [19]

Smith

[11] Patent Number: 5,819,808
[45] Date of Patent: Oct. 13, 1998

[54] METHOD FOR REDUCING STRESS AT A JUNCTION OF HIGH PRESSURE FLUID FLOW PASSAGES IN A BODY AND A JUNCTION FORMED THEREBY

[75] Inventor: Paul John Smith, Bretton, United Kingdom

[73] Assignee: Perkins Limited, Cambridgeshire, Great Britain

[21] Appl. No.: 571,715

[22] Filed: Dec. 13, 1995

[30] Foreign Application Priority Data

Dec. 16, 1994 [GB] United Kingdom ................. 9425414

[51] Int. Cl.⁶ .................... F16L 9/00; F02M 61/18
[52] U.S. Cl. ............... 138/177; 138/178; 138/39; 239/533.2
[58] Field of Search .................... 138/177, 178, 138/39; 239/533.3, 533.2, 533.9

[56] References Cited

U.S. PATENT DOCUMENTS

| 4,570,853 | 2/1986 | Schmied | 239/533.3 X |
| 4,658,824 | 4/1987 | Scheibe | 239/533.3 X |
| 4,715,540 | 12/1987 | Miyake | 239/533.3 |
| 5,192,026 | 3/1993 | Rix et al. | 239/533.3 |
| 5,292,072 | 3/1994 | Rix et al. | 239/533.3 |

*Primary Examiner*—Patrick F. Brinson
*Attorney, Agent, or Firm*—Nilles & Nilles S.C.

[57] ABSTRACT

A method for reducing stress at a junction of high pressure fluid flow passages in a body involves passage intersected by a secondary passage. The depression is formed to generally surround an outlet of the secondary passage but be spaced therefrom In one embodiment, the depression is circular, i.e. ring-shaped.

14 Claims, 3 Drawing Sheets

METHOD FOR REDUCING STRESS AT A JUNCTION OF HIGH PRESSURE FLUID FLOW PASSAGES IN A BODY AND A JUNCTION FORMED THEREBY

BACKGROUND OF THE INVENTION

1. Field of the Invention

The present invention relates to a method for reducing stress at a junction of high pressure fluid flow passages in a body and a junction formed thereby. This invention has a particular application in the field of internal combustion engine fuel injectors.

Where high pressure fluid flow passages intersect to form a junction in a body, stress is concentrated locally at the junction due to hoop stress. This can lead to cracking of the material of the body at the junction. The material of the body at the junction is particularly susceptible to cracking or some other failure of this nature if the junction comprises a primary fluid flow passageway and a secondary fluid flow passageway having an outlet connecting therewith at an acute angle to said primary fluid flow passage.

2. Description of the Prior Art

One known method of reducing the hoop stress concentrated at such a junction is to form an annular groove extending around the primary fluid flow passage at the position of the outlet. Whilst this helps direct hoop stress away from the material of the body adjacent the outlet, experience has shown that it is only partially successful in doing so.

It is also helpful to increase the angle of intersection of the secondary fluid flow passage with respect to said primary fluid flow passage to be as close as possible to 90°. However, design constraints for positioning the intersecting passages in the body may make this impracticable.

A further known method of reducing hoop stress concentrated at such a junction comprises electrochemically machining a pocket (recess) into an inner wall immediately surrounding the outlet of the secondary fluid flow passage. This gives a wider land at the outlet thereby reducing the concentration of stress. However, stress carried by the wall of the primary fluid flow passage still channelled towards the high stress area that surrounds the outlet at the junction thus undermining the effect of this known method.

OBJECTS AND SUMMARY OF THE INVENTION

It is an object of the present invention to provide a method of reducing stress at a junction of high pressure fluid flow passages in a body and a junction formed by said method.

According to a first aspect of the present invention, there is provided a method of reducing stress at a junction of high pressure fluid flow passages in a body, said method comprising the step of forming a depression in an inner wall of a primary fluid flow passage at a junction of said primary passage with an outlet of a secondary fluid flow passage connected therewith, wherein said depression is formed to generally surround and be spaced from said outlet.

Other features of the method of the invention will be apparent from the appended claims.

According to a second aspect of the invention, there is provided a junction of high pressure fluid flow passages in a body comprising a primary fluid flow passage and a secondary fluid flow passage intersecting said primary passage and having an outlet connected therewith, wherein an inner wall of the primary passage is formed with a depression surrounding and spaced from said outlet.

Other features of the junction of the invention will be apparent from the appended claims.

According to a third aspect of the present invention, there is provided a fuel injector for an internal combustion engine including a junction in accordance with the second aspect of the invention.

BRIEF DESCRIPTION OF THE DRAWINGS

The foregoing and further features of the present invention will be more readily understood from the following description of preferred embodiments, by way of example thereof, with reference to the accompanying drawings, of which.

DESCRIPTION OF THE PREFERRED EMBODIMENTS

Figure 1:
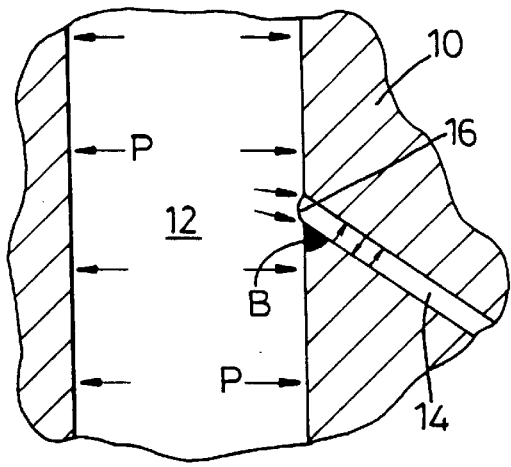
FIG. 1 is a sectional side view of a portion of a body illustrating a junction of high pressure fluid flow passages of simple form.

FIG. 1 illustrates a conventional junction between high pressure fluid flow passages in a body 10 comprising a primary fluid flow passage 12 intersected at an acute angle by a secondary fluid flow passageway 14 whose outlet 16 communicates with said primary fluid flow passage 12. The figure illustrates the isostatic pressure distribution P existing within the passages (12, 14) which results in a concentration of hoop stress in the material of the body 10 around the outlet 16 of the secondary fluid flow passage 14. The hoop stress is particularly concentrated at a side (B) of the outlet 16 which forms an acute angle with the primary fluid flow passage 12. In some instances, the material of the body 10 at the junction may crack or suffer some other similar form of failure, for example, a fracturing of the wall possibly resulting in a part of the wall breaking clear and passing into the fluid flowing in said passages (12,14).

Figure 2:
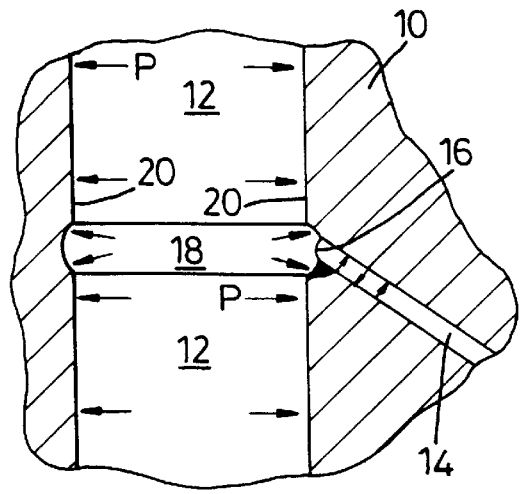
FIG. 2 is a similar view to FIG. 1 but illustrating a first known method for reducing stress at the junction.

FIG. 2 illustrates a first known method of reducing the stress concentration at the junction. This comprises forming an annular groove 18 extending around an inner wall 20 of the primary fluid flow passage 12 at the position of the outlet 16. The annular groove 18 may be formed by any suitable means including electrochemical machining, for example. Experience has shown that this solution has limited success since hoop stresses due to the isostatic pressure P of the fluid in the passages (12, 14) still concentrate around the outlet 16.

Figure 3:
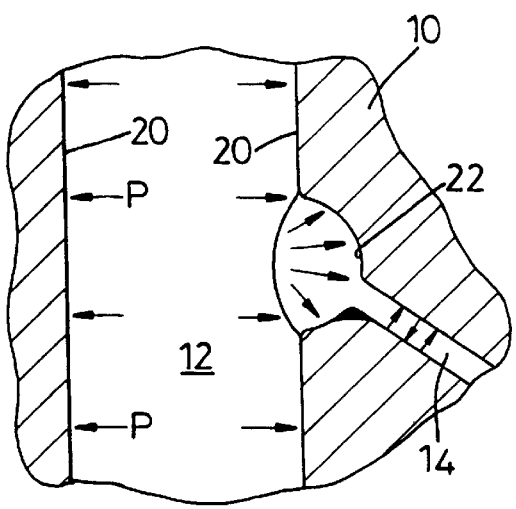
FIG. 3 is also a similar view to FIG. 1 but illustrating a second known method for reducing stress at the junction.
Figure 4:
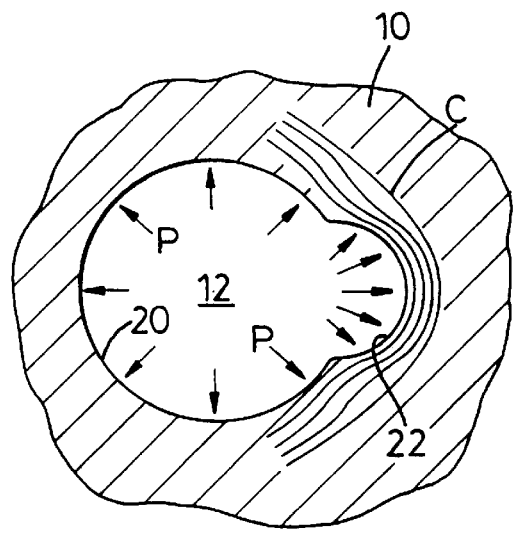
FIG. 4 is an end-on sectional view of FIG. 3 illustrating the loop stress pattern at the junction.
Figure 5:
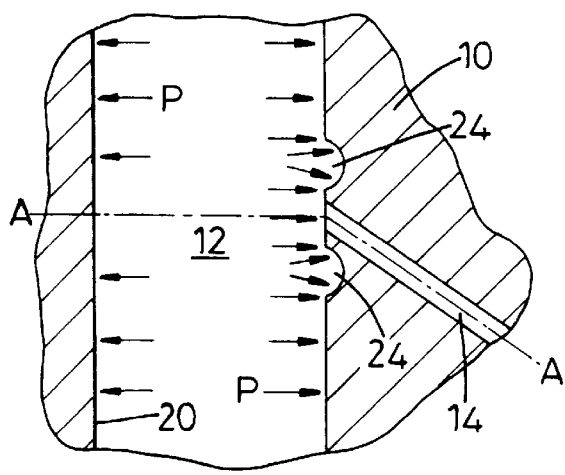
FIG. 5 is a side sectional view of a portion of a body illustrating a junction formed in accordance with a first embodiment of the present invention.
Figure 6:
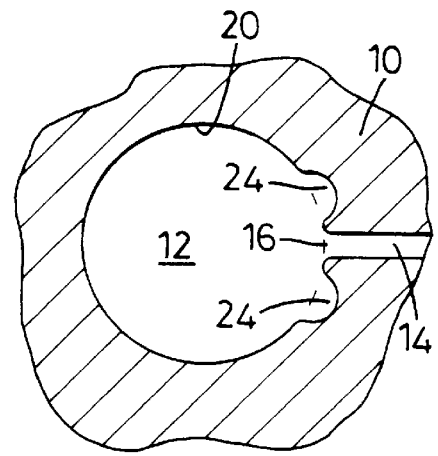
FIG. 6 is an end-on sectional view along line A—A of FIG. 5.
Figure 7:
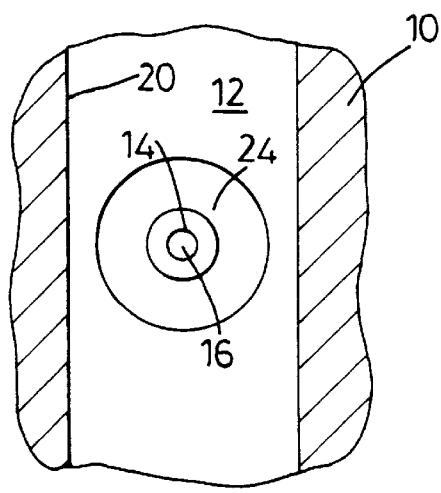
FIG. 7 is a view from the inside of the primary fluid flow passage illustrating the junction formed in accordance with the first embodiment of the invention.

FIG. 3 illustrates a second known method of reducing stress at the junction by electrochemically machining a pocket 22 in the inner wall 20 of the primary fluid flow passage 12 at the position of the outlet 16. Whilst this does alleviate hoop stress concentration around the outlet 16, it does not do so sufficiently to direct the stress towards other areas of the body 10 distant from the outlet 16. In FIG. 4, it can be seen that the hoop stress pattern C due to the isostatic pressure P of the fluid in the passages (12, 14) still concentrates in the material of the body around the outlet 16 and thus failure of material at the outlet 16 remains a distinct possibility.

The method of the present invention is illustrated by FIGS. 5 to 9. Like numerals are used to denote like parts. It can be seen from the figures that the method essentially comprises forming a depression 24 in the inner wall 20 of the primary fluid flow passage 12 to generally surround but be spaced from the outlet 16 of the secondary fluid flow passage 14 which communicates with the primary fluid flow passage 12. It has surprisingly been found that not only does the formation of the depression 24 generally surrounding but at a distance from the outlet 16 direct hoop stress away from said outlet 16 but that the isostatic pressure P of the fluid in the passages (12, 14) places the material of the body 10 immediately adjacent the outlet 16 into compression.

Figure 8:
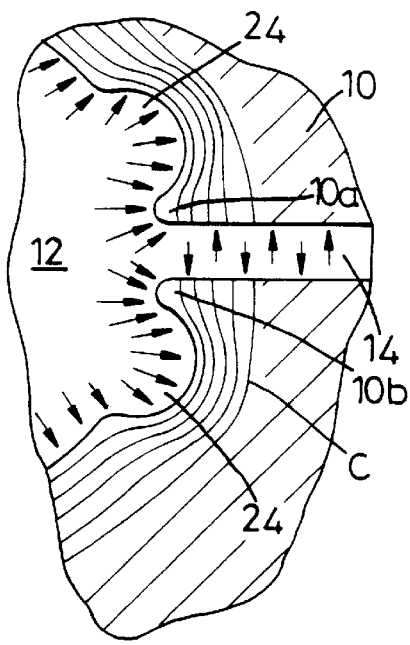
FIG. 8 is a view on an enlarged scale of a portion of FIG. 6 illustrating the isostatic pressure distribution within the primary fluid flow passage at the junction and the resulting hoop stress pattern in the wall of said passage surrounding said junction.

FIG. 8 particularly well illustrates the method of the invention. It can be seen from FIG. 8 that the isostatic pressure distribution P of the fluid in the passages (12, 14) creates a hoop stress pattern C in the material of the body 10 at the outlet 16 which directs stress, or at least reduces its concentration, from the portions (10a,b) immediately adjacent the outlet 16. Thus, the possibility of failure of the material of the body 10 at these critical portions of the junction is substantially reduced.

The depression 24 can be formed by electrochemical machining or any other suitable method. After the depression 24 has been formed, the inner wall 20 of at least the primary passage 12 may be honed to finish the surface of said inner wall 20. This will sharpen the edges of the depression 24, but will not adversely affect the stress relief characteristics of the improved junction so formed.

In a first embodiment as shown in FIGS. 5 to 8, the depression 24 completely surrounds the outlet 16 and is of a circular form such that all portions of the depression 24 are equally distant from the outlet 16 of the secondary fluid flow passage 14. However, it will be appreciated that stress analysis techniques allow calculations to be made to determine the desired dimensions of the depression 24 including distances of portions of it from the outlet 16. It will also be appreciated that the depression 24 may be spaced outwardly from the outlet 16 by a variable distance according to factors such as the diameters of the passages, the angle the secondary fluid flow passage 14 makes with the primary fluid flow passage 12 and the material of the body 10.

Figure 9:
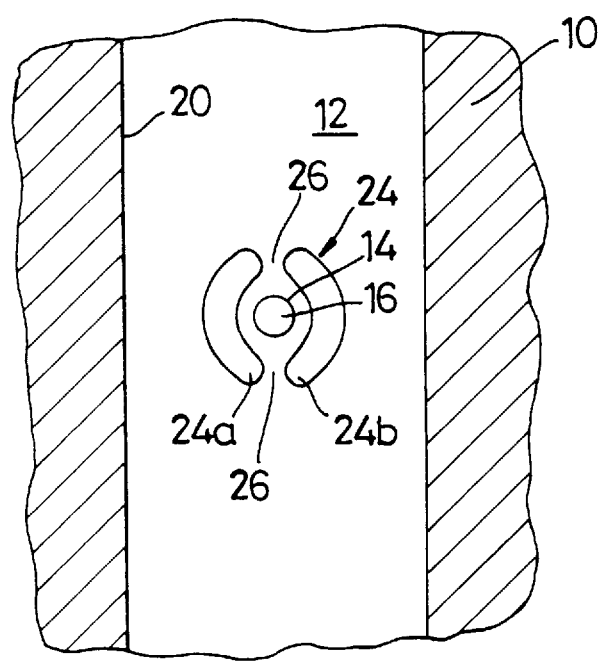
FIG. 9 is a view from the inside of the primary fluid flow passage illustrating the junction formed in accordance with a second embodiment of the invention.

In a second embodiment as shown in FIG. 9, the depression 24 comprises a pair of kidney-shaped depressions 24a and 24b. The. kidney-shaped depressions (24a,24b) curve inwardly toward each other surrounding but spaced from the outlet 16 of the secondary passage 14. Depressions 24 of this type are formed by, for example, electrochemical machining whereby, after the intersecting primary and secondary passages (12,14) are formed in a body, a mask is placed in the primary passage 12 to surround the outlet 16 of the secondary passage The mask protects those parts of the passages which are not to be electrochemically machined. Thus, in the case of this embodiment, the mask has kidney-shaped apertures which determine the size of the kidney-shaped depressions (24a,24b) so formed.

A central part of the mask which, in use, protects the outlet 16 and its immediate surrounds is connected to the remainder of the mask by support webs. These webs correspond to the areas 26 between the kidney-shaped depressions. It is important in the formation of the depression (24a,24b) that the mask is located such that the apertures defining the kidney-shaped depressions (24a,24b) lie generally parallel with a fluid flow direction of the primary passage 12. Thus, the unmachined areas 26 are located such that they do not adversely affect the stress relieving effect of the depressions (24a,24b).

It will be appreciated that a mask for electrochemical machining a depression 24 can be formed with more than two supporting webs. It is important, however, that the webs are carefully positioned so that areas between depressions formed using such a mask are not located in positions which would negate the stress relieving effect of the depressions so formed.

I claim:

1. A method of reducing stress at a junction of high pressure fluid flow passages in a body, said method comprising the step of forming a depression in an inner wall of a primary fluid flow passage at a junction of said primary passage with an outlet of a secondary fluid flow passage connected therewith, wherein said depression is formed to generally surround and be spaced from said outlet.

2. A method as claimed in claim 1, further comprising spacing the depression outwardly surrounding said outlet by a distance sufficient to direct stress to portions of the body more able to withstand it.

3. A method as claimed in claim 1, further comprising spacing portions of the depression outwardly from the outlet by distances determined from stress analysis calculations relating to the diameters of the passages.

4. A method as claimed in claim 1, wherein said method includes forming said depression to completely surround said outlet.

5. A method as claimed in claim 1, wherein said method includes forming the depression to be generally circular in plan view.

6. A method as claimed in claim 1, wherein said method includes forming said depression by electrochemical machining.

7. A method as claimed in claim 6, further comprising forming the depression as a pair of kidney-shaped depressions curved inwardly towards each other generally surrounding said outlet, wherein said kidney-shaped depressions lie generally parallel with a fluid flow direction in the primary passage.

8. A method as claimed in claim 1, further comprising the step of honing the inner wall of at least the primary passage after the depression has been formed.

9. A junction of high pressure fluid flow passages in a body comprising: a primary fluid flow passage and a secondary fluid flow passage intersecting said primary passage and having an outlet connected therewith, wherein an inner wall of the primary passage has formed therein a depression surrounding and spaced from said outlet.

10. A junction as claimed in claim 9, wherein the depression is space outwardly surrounding said outlet by a distance sufficient to direct stress to portions of the body more able to withstand said stress.

11. A junction as claimed in claim 9, wherein the depression completely surrounds the outlet.

12. A junction as claimed in claim 9, wherein the depression is generally circular in plan view.

13. A junction as claimed in claim 9, wherein the depression comprises a pair of kidney-shaped depressions curved inwardly towards each other generally surrounding but spaced from the outlet and said kidney-shaped depressions lie generally parallel with a fluid flow direction in the primary passage.

14. A fuel injector for an internal combustion engine including a junction comprising: a primary fluid flow passage and a secondary fluid flow passage intersecting said primary passage and having an outlet connected therewith, wherein an inner wall of the primary passage has formed therein a depression surrounding and space from said outlet.

\* \* \* \* \*